Dec. 1, 1970  J. MARCOVITCH  3,543,553
MACHINE FOR PROFILING SOLID WORKPIECES
Filed April 9, 1968  2 Sheets-Sheet 2

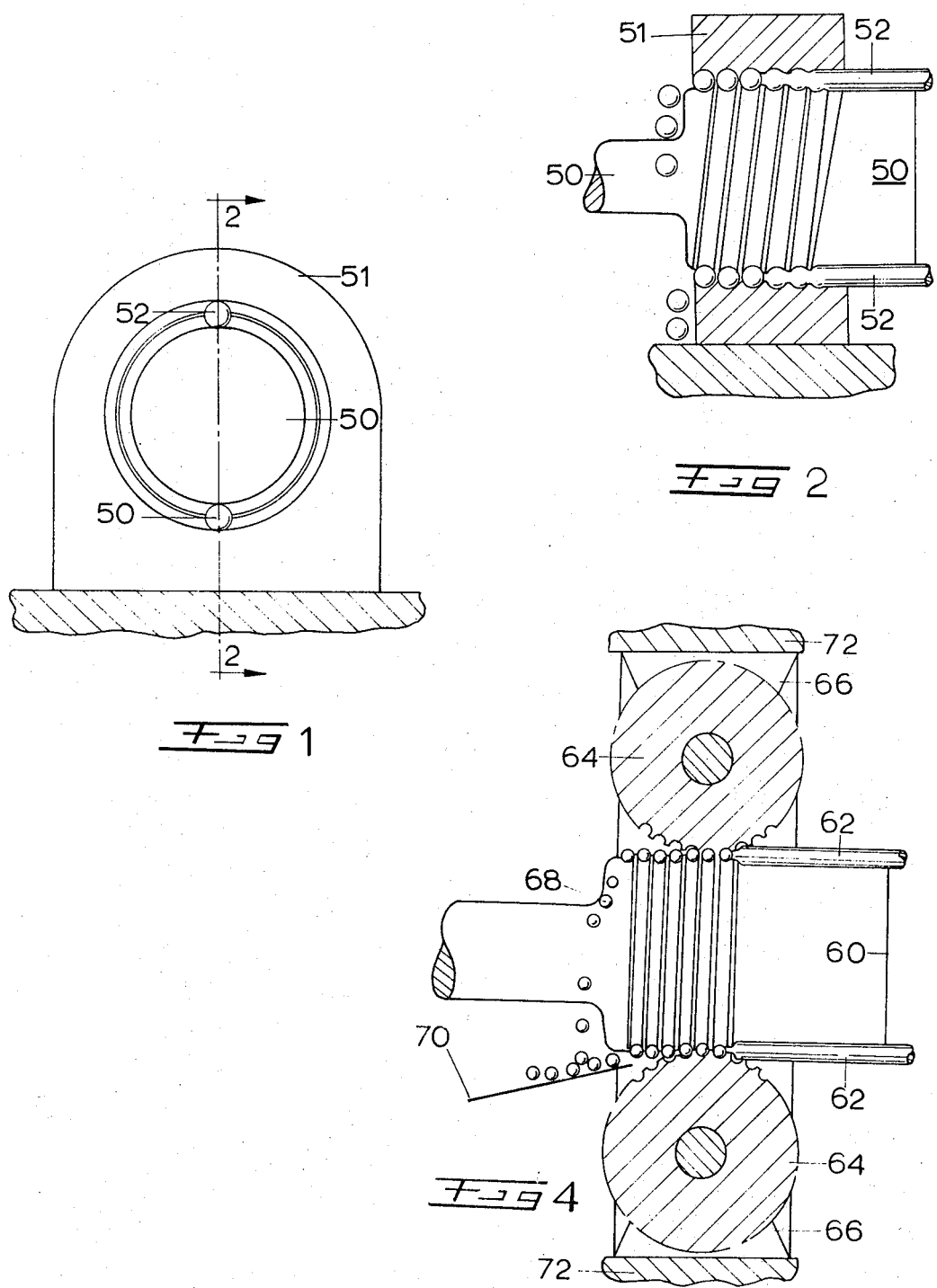

INVENTOR
JACOB MARCOVITCH
BY Young & Thompson
ATTYs 3,543,553
MACHINE FOR PROFILING SOLID WORKPIECES
Jacob Marcovitch, Johannesburg, Transvaal, Republic of South Africa, assignor to Rotary Profile Anstalt, Vaduz, Liechtenstein
Filed Apr. 9, 1968, Ser. No. 719,975
Claims priority, application Republic of South Africa, Apr. 19, 1967, 67/2,272
Int. Cl. B21h 1/16
U.S. Cl. 72—91                                      5 Claims

ABSTRACT OF THE DISCLOSURE

A machine for profiling rods to form articles such as balls, rollers or elongated articles, consisting of a scrolled inner roller surrounded substantially continuously by correspondingly scrolled structure. The inner roller defines with the outer structure an annular throat through which the rod advances to be progressively profiled on rotation of the inner roller relatively to the outer structure. The outer structure may be a bored member in which the inner roller is concentrically mounted, or it may be a series of rollers. The machine is capable of profiling two or more rods simultaneously, and the forces generated in it are in good balance.

---

This invention relates to machines for profiling solid workpieces in the form of bars to make articles such as balls and rollers for bearings. Although the articles will normally be discrete, emerging from the machine either separately or joined by a frangible web, the machine might also be used to produce lengthy articles whose diameter and profile vary along their length.

Many machines have been proposed for the manufacture of this type of article. Among many which produce balls from bars, a common type comprises two elongated rollers with helically scrolled circumferences, juxtaposed to define a throat extending along the lengths of the rollers. The rollers are geared and are driven about fixed axes so that they register in the throat. A bar is inserted in the throat at one end and traverses the throat, being progressively profiled by the scrolls as it advances. The bar is supported laterally by guides to hold it centrally in the throat throughout the operation. In a known development of this construction, the throat is defined by three rollers spaced equally around the workpiece, so eliminating the need for separate lateral supporting means but at the expense of restricting the minimum diameter of the profile.

The drawbacks of these machines are firstly that production rates are low, since only one bar passes through the machine at any given time; and secondly that since the forces in the machine are unbalanced, the machines must be massively constructed to withstand these forces. Installation and production costs are therefore high.

The object of this invention is to provide a machine in which the above-mentioned drawbacks are mitigated.

A specific object is to provide a machine in which a large output is possible, and which is dynamically balanced.

Another specific object is to provide a machine in which two or more bars can be profiled simultaneously.

According to the invention, the machine comprises an inner roller, scrolled on its circumference; structure surrounding the circumference of the inner roller substantially continuously and defining with it an annular throat, the surrounding structure being scrolled to correspond with the scroll on the inner roller; and means to rotate the inner roller about its axis relatively to the surrounding structure so that a workpiece in the form of a solid bar, inserted in one end of the throat, is entrained in the machine and drawn through the throat to be profiled by the scrolls.

The surrounding structure may be a hollow roller or bored housing within which the inner roller is mounted concentrically; or it may be a series of individually scrolled rollers arranged so that their surfaces surround the inner roller. In one arrangement, the axes of the outer rollers are generally parallel to that of the inner roller. In another, the outer rollers have their axes at right angles to that of the inner roller.

Two embodiments of the invention are described below with reference to the accompanying drawings, in which:

FIG. 1 is a semidiagrammatic end view of the operative portion of a machine for making balls;

FIG. 2 is a view along the line 2—2 in FIG. 1;

FIG. 4 is a view along the line 4—4 in FIG. 3.

Figure 3:
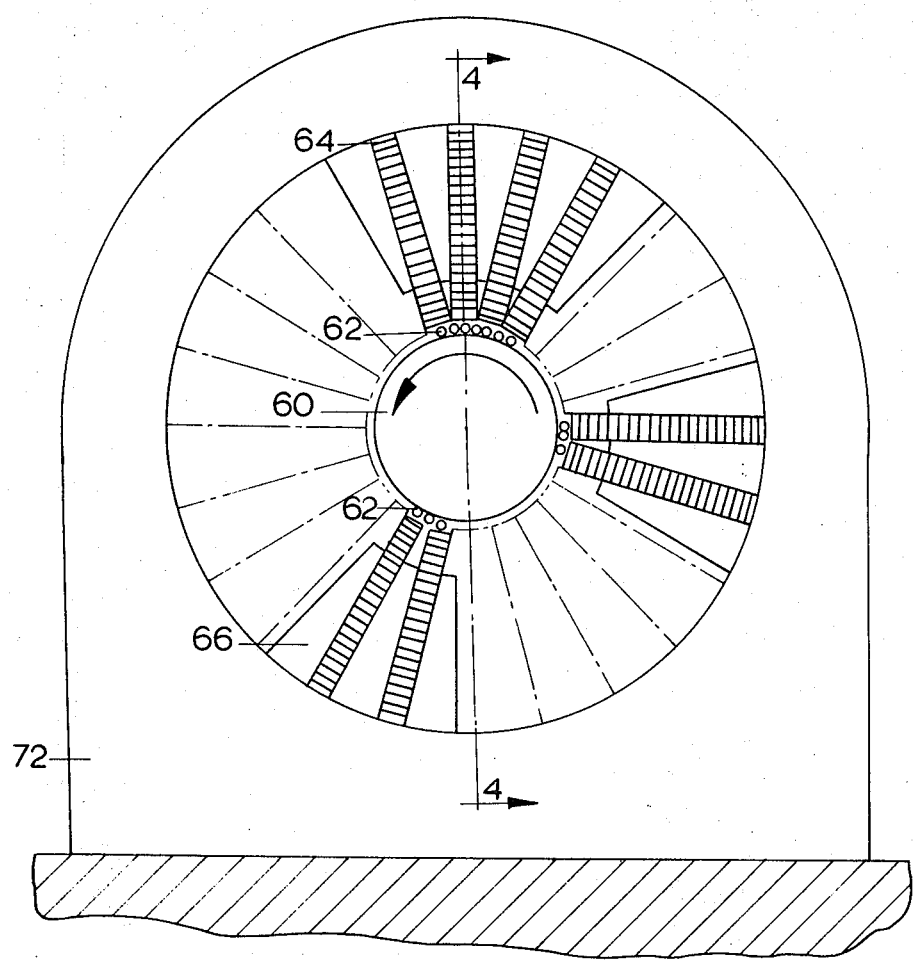
FIG. 3 is a semidiagrammatic view of another form of machine for making solids of revolution.

The machine of FIGS. 1 and 2 comprises an inner roller 50, mounted for rotation about its axis, and contained concentrically within an outer or surrounding structure in the form of a bored housing 51. Both the circumference of the roller 50 and the interior of the housing 51 are formed with corresponding helical scrolls that line the annular throat defined between them. The scrolls are of the same pitch and in this embodiment are two-start and of opposite hand or sense. The roller 50 is mounted cantilever-fashion in bearings and is driven, the mounting and driving means not being illustrated as they are well known in the art. The housing 51 is fixed.

The scroll arrangement is such that there are two lines along the length of the throat in which the scrolls in the roller and the bore are in register. These lines are spaced diametrically apart and accommodate two workpieces 52, which are entrained into and drawn through the throat from right to left in FIG. 2, the roller 50 being rotated as indicated by the arrow in FIG. 1. Since the workpieces are spaced equally round the inner roller, the machine is in good static and dynamic balance. The machine could, however, operate with a single-start scroll to accommodate only one workpiece, but the advantages in terms of high output and good balance are then lost.

The scrolls on the roller 50 and housing 51 are imperfect at the entry end of the machine, so that workpieces may readily be fed into it. As the workpieces advance along the throat, the scrolls bite deeper and approach closer to the form required to produce balls which are perfectly spherical. At the output end of the machine the scrolls provide this perfect sphere. The scrolls might be designed to produce individual balls, as illustrated in FIG. 2, or a series of balls linked by a slender web which can be removed in a simple finishing operation.

If the housing 51 is fixed and the roller 50 rotates, the workpieces will rotate about their axes and simultaneously orbit around the roller 50, maintaining their position diametrically apart on it. In feeding the machine with bars, this compound movement must be taken into account. Normally, the feed material will be either short bars, or continuous lengths fed from a spool or the like which is moved in sympathy with the movement of the workpiece in the machine.

It might be preferred to have the surrounding structure not, as illustrated, in the form of a fixed housing, but as a hollow roller rotatable concentrically with, but in the opposite direction to, the roller 50. In this case, with suitable roller speeds, the workpiece may be kept axially stationary although rotating about their axes. The feed arrangements are then simpler.

More workpieces might be simultaneously profiled than the two shown. With a three-start scroll, three workpieces could be accommodated, spaced equally apart around the inner roller; and so on. The balance of the machine remains good, at least dynamically.

Where very large outputs are required, not necessarily of spherical articles, the machine of FIGS. 3 and 4 is resorted to. It too has a cantilevered inner roller 60, surrounded circumferentially by scrolled structure in the form of a series of identical rollers 64 whose axes are at right angles to that of the inner roller 60. The roller 60 is set in bearings and is driven by means not illustrated. Each roller 64 is mounted in a bracket 66 extending radially from a bore in a fixed housing 72. For the sake of clarity, most of the rollers 64 are shown in ghost lines in FIG. 3. The rollers 64 are profiled longitudinally with portions of a scroll which, because of the close packing of the rollers 64 around the circumference of the roller 60, is substantially continuous. The rollers 64 are geared together by means not shown, and are arranged to be driven about their axes to synchronize with the rotation of the roller 60, with the result that the scroll on the roller 60 is always in register with that on the series of rollers 64.

The construction is such that workpieces can be accommodated virtually continuously around the roller 60. Any suitable number can thus be profiled simultaneously, provided the machine is sufficiently strong to withstand the forces generated and provided sufficient horsepower to drive it is available. As long as there are workpieces evenly spaced round the roller 60, the machine will be in good balance.

As with the machine of FIGS. 1 and 2, the workpieces 62 will orbit around the inner roller 60 as it is rotated as indicated by the arrow in FIG. 3. The feed to the machine will be consequentially arranged. If so desired, the fixed housing 72 might be replaced by a hollow roller as explained in relation to FIGS. 1 and 2.

The output of the machine is collected in a chute 70 or the like.

Where the articles produced by the machine are not spheres but some other figure of revolution, the scroll profile will naturally not be circular, as shown, but a shape complemental to that desired in the finished article. The scroll on the roller 60 in FIGS. 3 and 4 is constant in pitch and profile, and of single start. The grooves in the rollers 64 are also uniform. Progressive profiling of the workpiece takes place because of the convergence of the annular throat, so that the scrolls bite increasingly deeply into the workpiece as it advances.

I claim:
1. A machine for profiling solid workpieces in the form of bars, comprising an inner roller, scrolled on its circumference; structure surrounding the circumference of the inner roller substantially continuously and defining with it an annular throat, the surrounding structure having thereon a scroll complementary to and matching the scroll on the inner roller; and means to rotate the inner roller about its axis relatively to the surrounding structure so that a workpiece, inserted in one end of the throat, is entrained in the machine and drawn through the throat to be profiled by the scrolls.

2. The machine of claim 1 in which the surrounding structure is a series of rollers arranged so that their surfaces surround the inner roller.

3. A machine for profiling solid workpieces in the form of bars comprising an inner roller scrolled on its circumference; a series of rollers arranged about the inner roller, which outer rollers have their axes at right angles to the axis of the inner roller and with their peripheries substantially continuously surrounding the circumference of the inner roller and defining with it an annular throat; recesses formed in the said peripheries of the rollers, which recesses lie in a locus to form a scroll complementary to and in constant register with the scroll on the inner roller.

4. The machine of claim 3 further including gearing means connected to the outer roller to move them so that the scrolls defined by their surfaces is in constant register with the scroll of the inner roller.

5. The machine of claim 3 further including means to rotate the inner roller about its axis relatively to the surrounding structure so that a workpiece inserted in one end of the throat is entrained in the machine and drawn through the throat to be profiled by the scrolls.

References Cited
UNITED STATES PATENTS

| | | | |
|---|---|---|---|
| 385,752 | 7/1888 | Gould | 72—71 |
| 607,015 | 7/1898 | Brisben | 72—71 |
| 1,419,817 | 6/1922 | Canda | 72—98 |

LOWELL A. LARSON, Primary Examiner

U.S. Cl. X.R.

72—98, 100; 29—148.4